United States Patent
Quaglia et al.

(10) Patent No.: US 11,673,312 B2
(45) Date of Patent: Jun. 13, 2023

(54) SYSTEM AND METHOD FOR CAUSING THE ADVANCEMENT OF A CONSUMABLE IN THE FORM OF A CONTINUOUS SHEET IN A MACHINE FOR MANUFACTURING CONTAINERS

(71) Applicant: VOLPAK, S.A.U., Santa Perpetua de Mogoda (ES)

(72) Inventors: Silvio Quaglia, Milan (IT); Carlos Yera Montoya, Santa Perpetua de Mogoda (ES)

(73) Assignee: VOLPAK, S.A.U., Santa Perpetua de Mogoda (ES)

( * ) Notice: Subject to any disclaimer, the term of this patent is extended or adjusted under 35 U.S.C. 154(b) by 2 days.

(21) Appl. No.: 16/923,497

(22) Filed: Jul. 8, 2020

(65) Prior Publication Data

US 2021/0008784 A1 Jan. 14, 2021

(30) Foreign Application Priority Data

Jul. 9, 2019 (ES) ................ ES201930632

(51) Int. Cl.
  *B29C 55/06* (2006.01)
  *B29C 53/04* (2006.01)
  *B29K 23/00* (2006.01)
  *B29L 31/00* (2006.01)

(52) U.S. Cl.
  CPC .......... *B29C 55/06* (2013.01); *B29C 53/04* (2013.01); *B29K 2023/12* (2013.01); *B29L 2031/712* (2013.01)

(58) Field of Classification Search
  None
  See application file for complete search history.

(56) References Cited

U.S. PATENT DOCUMENTS

| 4,102,183 A | 7/1978 | Thenander |
| 2014/0045666 A1 | 2/2014 | Endou et al. |
| 2018/0002572 A1* | 1/2018 | Nieto ............... C09J 7/401 |

FOREIGN PATENT DOCUMENTS

| EP | 0626313 A1 | 11/1994 |
| EP | 0999134 A2 | 5/2000 |
| EP | 1394048 A1 | 3/2004 |

OTHER PUBLICATIONS

Spanish Search Report P201930632 dated Mar. 26, 2020.

* cited by examiner

*Primary Examiner* — Christopher T Schatz
(74) *Attorney, Agent, or Firm* — Sughrue Mion, PLLC

(57) ABSTRACT

A system for advancement of a consumable in the form of a continuous sheet in a machine for manufacturing containers having a first pulling group of the sheet actuated by a first motor at the end of the manufacturing zone, a second pulling group of the sheet actuated by a second motor at the end of the manufacturing zone, a support and deviation element of the sheet after the second pulling group equipped with a load cell for estimating the tension, and a processor programmed to direct the individual actuation of the first and second motors, such that the pulling groups promote the advancement of longitudinal portions of sheet sufficiently different to correct deviations in the tension of the sheet with respect to a pre-established target tension. A method for intermittent advancement of the sheet having a correction phase of the tension wherein only the second motor is actuated.

7 Claims, 3 Drawing Sheets

SYSTEM AND METHOD FOR CAUSING THE ADVANCEMENT OF A CONSUMABLE IN THE FORM OF A CONTINUOUS SHEET IN A MACHINE FOR MANUFACTURING CONTAINERS

TECHNICAL FIELD OF THE INVENTION

The invention relates to a system for causing the advancement of a consumable in the form of a continuous sheet in a machine for manufacturing containers. The system has the purpose of maintaining the tension of the sheet in a desired area of the machine within pre-established, optimal values according to the material the sheet is made of, that guarantees the correct handling and the correct performance of operations on the same.

The invention further relates to a method for causing the advancement in the form of intermittent advancement of a consumable in the form of a continuous sheet in a container manufacturing zone of a machine for manufacturing containers, a method that can be put into practice with the system of the invention.

BACKGROUND OF THE INVENTION

Machines for manufacturing, filling and closing containers from a consumable in the form of a continuous sheet are known. The sheet, conventionally wound around a core, is stretched on demand by the process which first comprises performing simple folding operations, W-shaped or other type, of the sheet on itself to manufacture the bottom of the containers, in what is called a folding zone of the machine; and successive operations of attachment between opposing portions of the already folded sheet, by means of melting the material which makes up the sheet to form successive pockets in the still continuous sheet, prior to individualising these pockets by cutting the sheet to thus obtain successive containers, in a zone known as the manufacturing zone of the machine.

In the manufacturing zone, the attachment operations conventionally comprise performing transverse welding of the folded sheet and of welding in the bottom portion of the containers. These operations are carried out with the continuous sheet stationary, which requires causing an intermittent advancement of the sheet at least in the manufacturing zone of the machine.

This intermittent advancement is conventionally ensured by a pulling group arranged at the end of the manufacturing zone of the machine and which uses a pair of rollers, of which at least one is a motorised roller, between which the pressed sheet passes being stretched by friction with the rollers when said rollers are rotated. This pulling group, in practice, pulls the sheet sufficiently to cause the advancement thereof through the manufacturing zone and, occasionally, also through the previous folding zone, ensuring the unrolling of the core thereof downstream from the folding zone.

In time, this technique has been improved and it is possible to combine a continuous stretching of the sheet and the advancement also continuous thereof through the folding zone with an intermittent advancement in the manufacturing zone. To this end, some machines incorporate a pulling group in the folding zone which works without interruption and accumulating means of the sheet between the folding and the manufacturing zones equipped with a tensioner rocker which ensures an essentially constant tension of the sheet is kept in the manufacturing zone.

More recently, there has been an interest in replacing difficult to recycle sheet materials with materials that improve the container cycle, in terms of collection and recycling. For example, it is of interest to work with alternatives to aluminium or aluminium-sprinkled sheets such as sheets devoid of metallic materials. However, these new materials, e.g. made of bio-orientated polyester or polypropylene, suffer from the stresses generated in the folding process and especially in the manufacturing process of the containers in a dangerous way. Specifically, if they are applied above specific tension values, they can suffer non-reversible plastic deformations. This is the case of the manufacturing zone in the machines described above, wherein the sheet is suddenly stretched at each advancement cycle of the machine, an aspect that is aggravated by the fact that it is a hot zone of the process due to the local heat contribution made to the material in order to carry out the attachment operations by fusion of the material that makes up the sheet.

These deformations, even if they do not irreversibly deform the sheet, may cause variations in the theoretical dimensions of the containers that make it difficult to determine the exact position of the welding elements and, in general, of manufacturing of the pockets in the folded sheet.

Consequently, there is a special interest in controlling the deformation the sheet is subjected to in this manufacturing zone of the containers.

To that effect, there are proposals based in the recognition and detection of marks incorporated by the sheets. These marks, the detection of which is used to trigger timely operations on the sheet, are in an ideal scenario equidistantly arranged along the sheet.

These proposals envisage the use of intermediate pulling groups, for example, by means of the use of another pair of actionable rollers in rotation at the beginning of the manufacturing zone, and of photocells to detect the passage through the pulling groups of the marks of the sheet. The delays or the difference in the detection time of the marks in the different pulling groups are assumed as a consequence of a stretching of the sheet, due to a high tension, and are used to speed up or slow down at least one of the pulling groups. However, the precision of these solutions depends on the regularity between the marks in the sheet and it is very common that the distance between marks can vary along the unrolling thereof. These variations are known by all the manufacturers of packaging machines, so it is always recommended that the distance between marks is within a tolerance.

The precision of these solutions based on the detection of marks in the sheet is therefore subjected, as we have said, to the precision of the placement of said marks in the sheet. As a consequence thereof, this can lead to tension or distension in the sheet that can make deficient, by not being equidistant, attachment and/or welding operations, therefore resulting in a deficient forming of the containers.

It is a first objective of the present invention to disclose an alternative to the known systems to keep control over the deformation of the sheet, especially in the forming zone.

Another objective of the present invention is a more robust solution that those known, more precise and which is not based on the detection of marks incorporated in the sheet to trigger operations on the same, as might be the transverse cutting of the sheet to individualise the containers.

DESCRIPTION OF THE INVENTION

The proposed system is an intelligent pulling system, which is appropriate for causing the advancement of a consumable in the form of a continuous sheet, for example, in a machine for manufacturing containers from a continuous sheet of flexible plastic material that is stretched off a winding and that is sequentially subjected to several operations in at least a folding zone and a container manufacturing zone.

In essence, the system is characterised in that it comprises
a first pulling group of the sheet by means of a first pair of rollers, of which at least one is a roller actuated by a first motor, arranged at the end of the manufacturing zone,
a second pulling group of the sheet by means of a second pair of rollers, of which at least one is a roller actuated by a second motor, arranged at the end of the folding zone or at the beginning of the manufacturing zone,
at least one support and deviation element of the sheet arranged after the second pulling group and equipped with at least one load cell to measure the force exerted thereon by the sheet between the first and the second pulling groups and thus estimate the tension the sheet is subjected to between said first and second pulling groups, and
processing means which receive the input of the load cell or cells and which are programmed to direct the individual actuation of the first and second motors of the first and second pulling groups, respectively, such that they promote the advancement, in the path thereof, of longitudinal portions of sheet sufficiently different as to correct deviations in the tension of the sheet with respect to a preestablished target tension.

With the information of this load cell or cells, the tension of the sheet in the manufacturing zone can be estimated and this information is used to accurately coordinate the first and the second pulling groups and minimise the deformation of the sheet avoiding positioning errors in the sheet of the operations performed in this manufacturing zone, errors that are not fully avoidable when other solutions are used, especially those based on the detection of marks in the sheet.

Coordinating must be understood as the direction of the actuation of the first and the second pulling groups such that the tension in the sheet can be kept or said tension modified if it is not optimal, ensuring a different linear advancement of the sheet through the mentioned first and second pulling groups. This effect can be achieved by applying, at least temporarily, different regimes of acceleration, speed, duration of the actuation, direction of the actuation, or a combination of these measures, to the first and second actuation motors of the first and second pulling groups.

It is worth noting that the control of the tension of the sheet entails being able to control the stretching or deformation of the sheet. In the present proposal, this tension is directly estimated and the pulling groups are actuated on in order to keep it within a target value or interval unlike the known proposals, which intend to directly measure the deformation the sheet suffers by detecting the marks said film incorporates, with the drawback that said marks don't keep an identical distance between each other because there are manufacturing tolerances.

The target tension value to determine if the working tension is optimal is a function of the material the sheet is made of and of other parameters of the process underway, such as attachment temperature, attachment time, etc., associated to the operations that are carried out on the sheet in the manufacturing zone.

Target tension value must be understood as a specific value or a range. In practice, an upper threshold value P1 and a lower threshold value P2 can be established which can be selected by the operator or can be automatically established when the machine detects the type of consumable being used and the manufacturing program to be executed, in both cases on the basis of accumulated experience.

The invention envisages the use of information received from the load cell or cells while the sheet is being pulled for the advancement thereof, while the sheet is stationary and even while operations are carried out on the same in the manufacturing zone.

In a variant of the invention, the processing means are programmed to:
in an advancement phase, actuate the first and the second motors of the first and the second pulling groups to cause an advancement of a provisional sheet length and arrange it in the mentioned manufacturing zone;
with the sheet stationary, analyse the tension value in the sheet obtained by means of the load cell or cells to know if it exceeds or does not reach the target tension value; and
in a subsequent correction phase, actuate the first and/or the second motor such that the respective first and second pulling groups ensure, in the path thereof, the advancement of different longitudinal portions of sheet if, when the advancement phase ends, the tension value of the sheet deviates from the target tension.

Preferably, in this subsequent correction phase, if the tension value of the sheet deviates from the target tension, only the second motor will be actuated and therefore, the first pulling group will not ensure any pulling effect of the sheet. Therefore, the longitudinal portion of sheet that will advance through the first pulling group will be zero.

In a preferred embodiment, the processing means are programmed not to actuate the rotation of the first motor and to actuate the second motor in the correction phase
such that it ensures the pulling of the sheet in the forward direction towards the manufacturing zone if the tension value in the sheet exceeds the target tension; or
such that it ensures the pulling of the sheet in the opposite direction of advancement towards the manufacturing zone if the tension value in the sheet does not reach the target tension.

According to an embodiment of interest, the load cell or cells are traction load cells installed for the measurement of the tractive power in a direction coinciding with the bisector of the angle formed by the sheet between the inlet and the outlet of the support and deviation element.

Advantageously, the real tension value can be thus estimated from the measurements of the load cell or cells with higher precision.

In an embodiment, the support and deviation element comprises a rotary roller rotating around a support shaft parallel to the rotation axes of the first and the second pairs of rollers and is equipped with two load cells, each one of which connects one of the ends of the support shaft to a fixed component of the machine, preferably of the frame of the machine.

Having a forming triangle of the bottom of the containers and a sheet accumulator equipped with a tensioning rocker in the folding zone of the machine and in the forward direction of the sheet, in an interesting variant the system comprises a third pulling group of the sheet by means of a third pair of rollers, of which at least one is a roller actuated by a third motor, arranged at the outlet of said forming triangle of the bottom and before the sheet accumulator. In this variant, the actuation of the third pulling group ensures the sheet advancement in a continuous manner at the same time as the processing means actuate in an intermittent and intelligent manner the first and second pulling groups to keep the tension of the sheet within the target tension value or range.

According to the present invention, a method for causing the advancement in the form of intermittent advancement of a consumable in the form of a continuous sheet in a container manufacturing zone of a machine for manufacturing containers, wherein said sheet is subjected to at least a sealing operation while remaining stationary, comprises in an advancement phase, causing an advancement of a provisional sheet length to arrange it in the mentioned manufacturing zone by means of the actuation of a first and a second pulling groups of the sheet arranged at the beginning and at the end, respectively, of the manufacturing zone and actuated by both the first and the second motors;

measuring the tension of the sheet between the first and the second pulling groups, at least one time once the pulling phase is finished;

comparing the tension measured with a preestablished target tension value; and in a correction phase, prior to performing the sealing operation on the sheet, actuating the first and/or second motor such that the respective first and second pulling groups have ensured a definitive advancement, in the path thereof, of longitudinal portions of sheet sufficiently different as to correct deviations of the tension of the sheet with respect to the target tension value.

Preferably, the correction phase comprises actuating only one of the first and second motor during a time interval, and more preferably it comprises actuating only the second motor.

According to this variant of the invention, the correction phase comprises actuating the second motor in the direction that the second pulling means ensure a backward motion of an excess longitudinal portion of the sheet if the tension value measured is below the target tension value; or actuating the second motor in the direction that the second pulling means ensure an advancement motion of an extra longitudinal portion of the sheet if the tension value measured exceeds the target tension value.

The invention contemplates, in the advancement phase, the actuation of the first and the second motor such that the first and second pulling groups ensure, in the path thereof, the advancement of different longitudinal portions of sheet.

In the definition of method according to the invention, the action of measuring the tension of the sheet between the first and second pulling group is mentioned, at least once the advancement phase is finished. This means that the invention does not exclude that the tension measurement can also be performed during the advancement phase of the sheet or while the sheet is stationary and operations are carried out on the same. For example, this allows the tension peaks in the sheet to be known even during the advancement phase.

In a variant of the method, the advancement phase comprises actuating the second motor instants before actuating the first motor to thus attenuate tension peaks in the sheet during the advancement phase.

DETAILED DESCRIPTION OF THE EMBODIMENT

Figure 1:
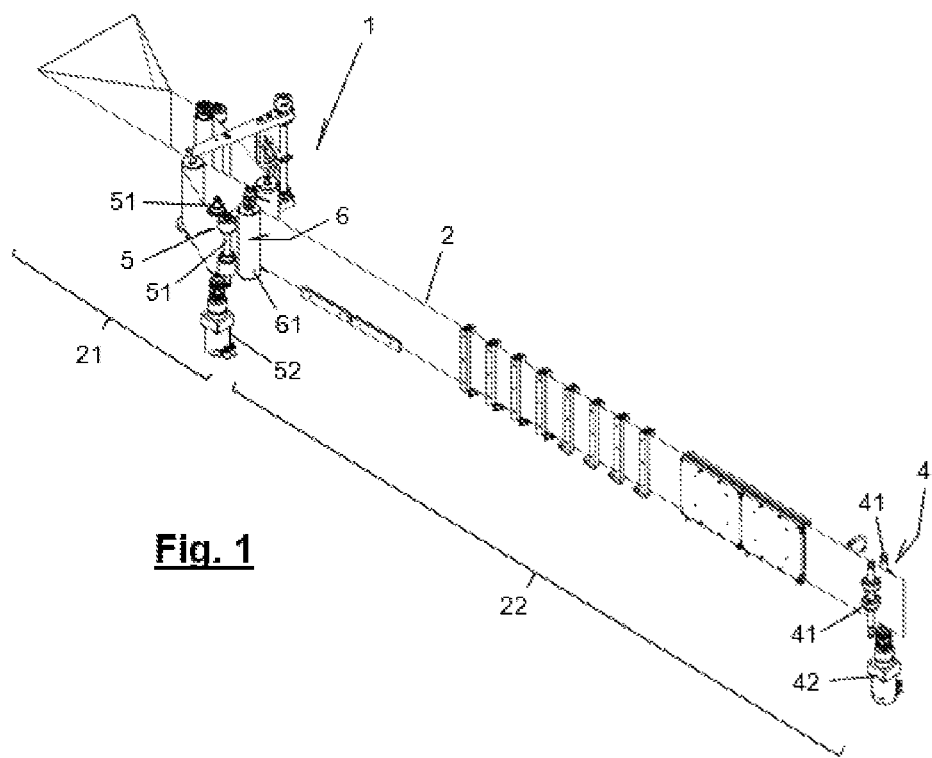
FIG. 1 is a perspective view of the container folding and manufacturing zones of a machine for manufacturing containers with a pulling system according to a first embodiment of the invention.
Figure 2:
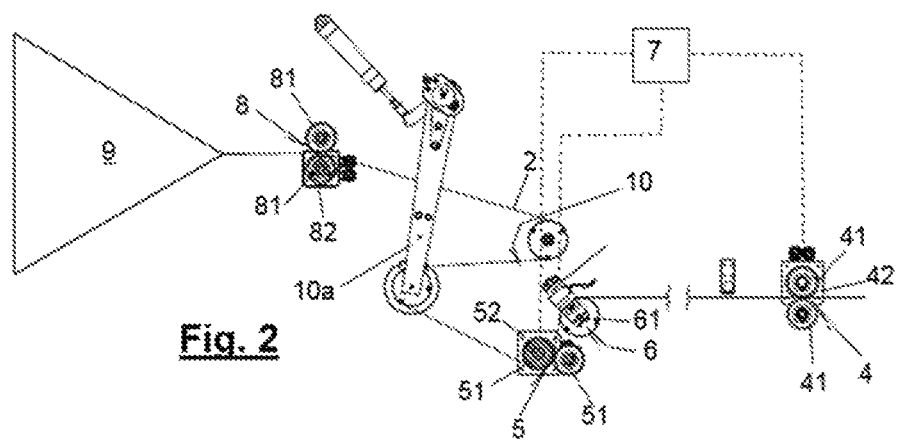
FIG. 2 is a schematic view of the pulling system of the machine of FIG. 1, in plan view.

FIGS. 1 and 2 show the folding 21 and the manufacturing zones 22 of containers of a machine for manufacturing, filling and automatic closing of flexible containers, from a continuous sheet 2 of flexible material.

In the folding zone 21 the machine has a folding machine to form in the sheet 2, as it passes through the folding machine, one or several longitudinal folds depending on the type of container to manufacture, such that when exiting the folding machine, the sheet exhibits two opposing faces, attached by a bottom for example in a V or W shape in manufacturing processes of containers of the pouch or doypack type, respectively. The experts in the sector refer to this folding machine as forming triangle of the bottom 9 or simply triangle.

In the manufacturing zone 22 the already folded sheet 2 is subjected to several attachment operations of the opposing walls thereof to form successive pockets which will determine the containers when the sheet is transversally cut. We will call these attachment operations sealing operations. In the example of FIG. 1, each pocket is formed by means of a longitudinal sealing or welding in the bottom portion of the sheet and by means of two transverse sealings, separated at a distance equivalent to the width of a container.

Conventionally, a first pulling group 4 intervenes in the pulling system of the sheet 2 along this folding 21 and manufacturing zone 22, of the type formed by two rotary rollers 41 between which the folded sheet 2 is made to pass, tightened, such that the rotation of the rollers 41 causes the advancement of sheet 2 by means of friction. In the example, one of the rollers 41 is a roller actuated by a first motor 42 and the other roller 41 is a driven roller, for example, by means of a gear system with the actuated roller. Preferably, the first motor 42 is a servomotor that incorporates an adjusting system which can be controlled both in speed and in position. This first pulling group 4 is arranged at the end of the manufacturing zone 22 and pulls the sheet 2.

In the system 1 of the invention, a second pulling group 5 further intervenes in the pull of the sheet 2, similar to the first pulling group 4 but arranged between the folding 21 and manufacturing 22 zones. Therefore, this second pulling group 5 comprises in the example two rotary rollers 51 between which the just folded sheet 2 is made to pass, tightened, such that the rotation of the rollers 51 causes the advancement of sheet 2 by means of friction. In the example, one of the rollers 51 is a roller actuated by a second motor 52 and the other roller 51 is a driven roller, for example, by means of a gear system with the actuated roller. Preferably, the second motor 52 is a servomotor that incorporates an adjusting system which can be controlled both in speed and in position.

The system 1 of the invention is prepared to actuate individually, but in an intelligent manner, the rollers of the first and second pulling groups 4 and 5, being able to keep a target tension in the sheet 2 between the first and the second pulling groups 4 and 5.

More specifically, the system 1 of the invention is especially prepared to cause the advancement in the form of intermittent advancement of the sheet 2, the rollers of the first and the second pulling groups 4 and 5 actuating individually such that in each stroke of the machine, they can promote the advancement, in the path thereof, of longitudinal portions of sheet 2 slightly different if necessary, such that if the first pulling group 4 stretches a greater amount of sheet 2 than that provided by the second pulling group 5, the tension will increase in the sheet 2 between said first and second pulling groups, that is in the manufacturing zone 22. Likewise, if the first pulling group 4 stretches a lesser amount of sheet 2 than that provided by the second pulling group 5, the tension in the sheet 2 will decrease between said first and second pulling groups. To do this, the invention envisages playing with the rotation speeds of the rollers 41 and 51; with the rotation accelerations of the rollers 41 and 51; with the time during which motors 42 and 52 actuate the rollers; with the direction of rotation of the first and second motors 42 and 52, and therefore with the direction of rotation of the rollers 41 and 51; or with a combination of these measures.

The system 1 of FIGS. 1 and 2 is completed with a support and deviation element 6 of the sheet which is equipped with load cells 62 for measuring the force exerted therein by the sheet 2 between the first and the second pulling groups, this support and deviation element 6 being arranged after the second pulling group 5 of the sheet 2; and with processing means 7 which receive the input of the load cells 62, and thus enable the real tension to which the sheet 2 is subjected between the first and the second pulling groups 4 and 5 to be estimated, and which are capable of directing the actuation of the first and the second motors 42 and 52 in the optimal manner to keep said tension of the sheet 2 within a preestablished target value, especially when the sheet is stationary, such that it enables the correction of an eventual excess tension in the sheet 2; and the corrections of an eventual low tension in the sheet 2.

The aforementioned target tension value can be a range. Thus it is envisaged to establish an upper threshold value P1 and a lower threshold value P2, such that the processing means will be able to compare in real time if the tension of the sheet exceeds the first threshold value P1 and then correct an excessive tension in the sheet 2; and compare in real time if the tension of the sheet is under the first threshold value P2 and then correct the low tension in the sheet 2. The threshold values P1 and P2 can be absolute values or their value can be established as a percentage of an optimal target value.

This target tension value, or where applicable, the threshold values, are in any case is a function of the material that the sheet 2 is made of and of other parameters of the process underway, such as the necessary attachment temperature and attachment time necessary to perform the sealing operations on the sheet 2 in the manufacturing zone 22 of the machine.

Figure 3A:
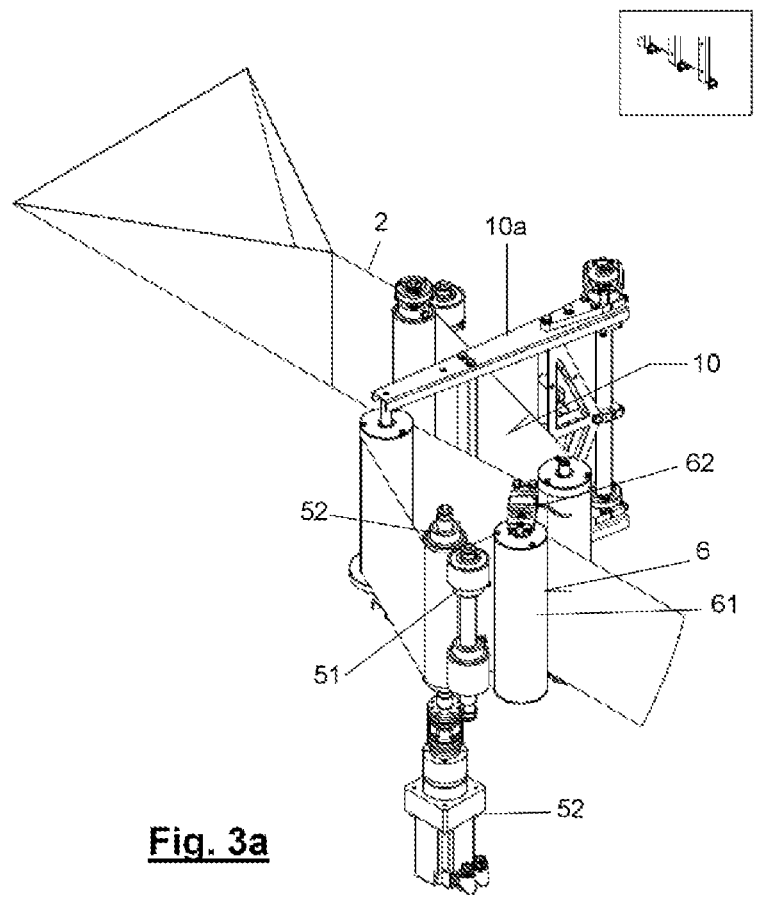
FIG. 3a is an enlarged view of the folding zone of FIG. 1.
Figure 3B:
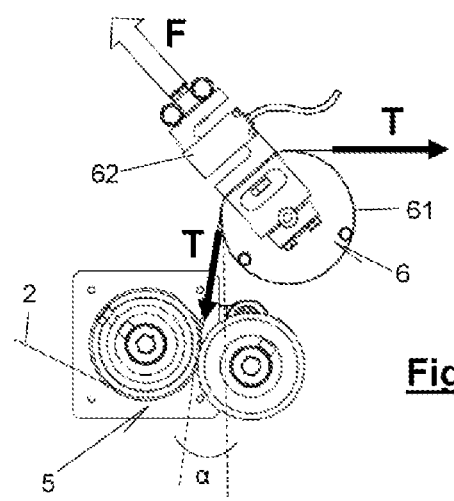
FIG. 3b is a plan view of the sheet as it passes through the support and deviation element.
Figure 3C:
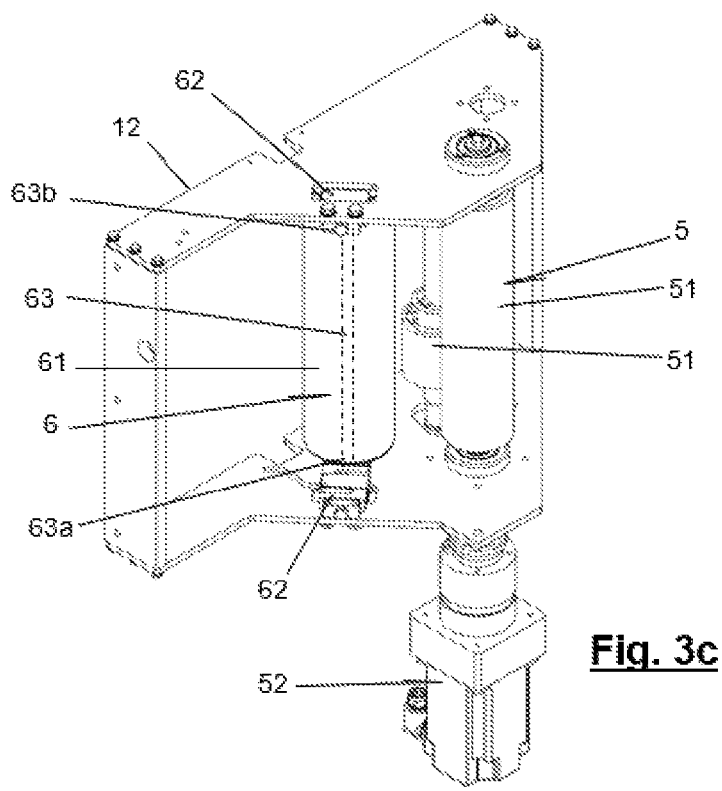
FIG. 3c is a detail view of the support and deviation element equipped with two load cells.

FIGS. 3a to 3c show in greater detail the support and deviation element 6 of the system 1 exemplified by the invention.

In this example, the second pulling group 5, the support and deviation element 6 and the first pulling group 4 (see FIG. 3b) are arranged such that they force the sheet 2 to form an angle slightly greater than 90° between the inlet and the outlet of the support and deviation element 6. This angle can preferably be smaller than 90°.

The load cells 61 are arranged for the measurement of the tractive power in a direction coinciding with the bisector of the angle formed by the sheet 2 between the inlet and the outlet of the support and deviation element 6.

This particular orientation is advantageous for estimating the real tension in the sheet 2. In the example of FIG. 3c, said tension T can be estimated by fulfilling the relationship: T=F 2(1−sen α), F being the force measured by the load cells.

$$T = \frac{F}{\sqrt{2(1 - \sin\alpha)}}$$

As FIG. 3c shows, an embodiment of interest is that wherein the support and deviation element 6 and the second pulling group 5 are mounted on a common support 12. In the example, the support and deviation element 6 comprises a rotary roller 61 rotating around a support shaft 63 (partially hidden) parallel to the rotation axes of the pair of rollers 51 of the second pulling group 5, and is equipped with two load cells 61, each one of which connects one of the ends 63a, 63b of the support shaft 63 to the common support 12, which is able to be fastened to the frame of the machine. Utilcell® provider 630 model load cells are an example of appropriate cells for the implementation of the invention.

A manner of proceeding with this system 1 is exemplified below.

It is intended to cause the advancement in the form of intermittent advancement of a continuous sheet of polypropylene material in the manufacturing zone 22 of doypack style containers in a horizontal machine for manufacturing containers. Each machine stroke ensures the advancement through the manufacturing zone 22 of a longitudinal portion L of the sheet sufficient for the manufacture of four containers, L being a maximum length of 4×92.6 mm. With the sheet stationary in the manufacturing zone 22, sealing operations are carried out on the sheet, with heat contribution. A typical temperature of the welding clamps used for this can be comprised between 150° and 180° C. A target tension value is 45 N.

Starting from a stationary position, with all the operators (sealing clamps, cutting devices, etc.) which work on the sheet removed, the following takes place in order to cause the advancement of the sheet:

In an advancement phase, first the second motor 52 and an instant later also the first motor 42 are actuated, such that each one of the rollers 51 and 41 of the associated pulling groups 4 and 5 each pull a theorical length L of provisional sheet in the forward direction along the manufacturing zone 22.

Next, the tension of the sheet 2 is obtained with the load cells 62 and this is compared to the preestablished target tension value, in this case it is determined if the tension value of the sheet is greater or less than 45 N.

Next, in a correction phase, and prior to the performance of sealing operations on the sheet, actuating only the second motor 52 in the direction that the second pulling means 5 ensure a backward motion of an excess longitudinal portion of the sheet 2 if the tension value measured is below 45 N, in a sufficient amount for the sheet tension to increase and reach 45 N (with the tolerance considered optimal), actuating only the second motor 52 in the direction that the second pulling means 5 ensure a forward motion of an extra longitudinal portion of the sheet 2 if the tension value measured exceeds 45 N, in a sufficient amount for the sheet tension to decrease until reaching 45 N (with the tolerance considered optimal); or no motor is actuated and the advancement of the sheet is deemed complete if the tension of the sheet 2 measured when the advancement phase is finished was already 45 N (with the tolerance considered optimal).

Once the correction phase (if any) is finished, the operators are actuated to perform the sealing operations on the sheet.

Once the operations that are performed on the sheet are finished, the aforementioned sequence can be repeated again.

It is worth noting that the system 1 of the invention is compatible with methods in which the sheet 2 is continuously unrolled off the storage thereof, generally in a winding form. Thus, in the examples of FIGS. 1 and 2, having a forming triangle of the bottom 9 of the containers and a sheet 2 accumulator 10 equipped with a tensioning rocker 10a in the folding zone 21 of the machine and in the forward direction of the sheet 2, said system 1 comprises a third pulling group 8 of the sheet 2 by means of a third pair of rollers 81, of which at least one is a roller actuated by a third motor 82, arranged at the outlet of said forming triangle of the bottom 9 and before the sheet 2 accumulator 10.

While this third pulling group 8 is being actuated in a continuous manner, the first and second pulling groups 4 and 5 will be actuated in an intermittent and intelligent manner as described above.

The system 1 of the invention is further compatible with methods wherein the sheet 2 is not continuously unrolled off the storage thereof.

Figure 4:
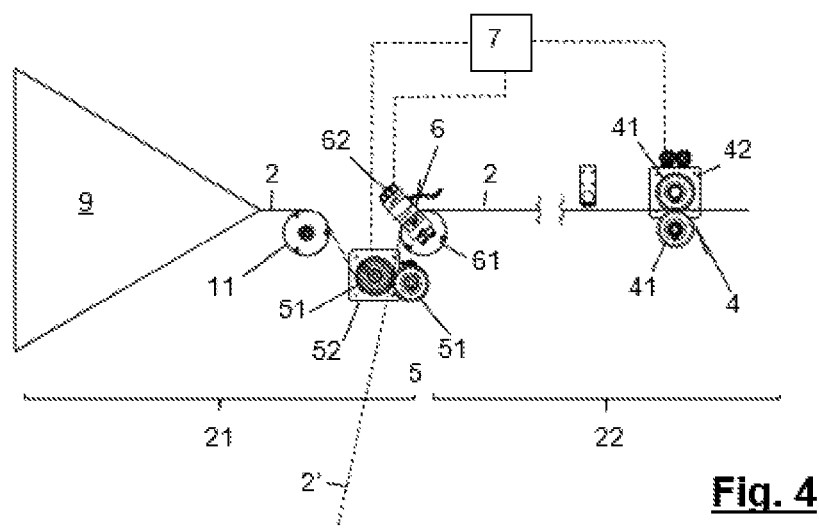
FIG. 4 is a schematic view of another pulling system according to the invention.

FIG. 4 schematically shows the pulling system 1 applied to a machine devoid of the third pulling group, the system 1 comprising only a first pulling group 4 at the end of the manufacturing zone and a second pulling group 5 between the folding zone 21 and the manufacturing zone 22.

FIG. 4 intends to illustrate how the system 1 can be incorporated in existing machines. To that end, an auxiliary support and deviation element 11 is used at the outlet of the folding machine to orientate the sheet 2 such that at the outlet of the second pulling group 5 it forms an angle with the direction followed by the sheet 2 along the manufacturing zone 22 making possible the estimation of the tension by means of the support and deviation element 6. The auxiliary support and deviation element 11 would be dispensable if the folding machine was positioned such that the sheet already followed an optimal direction for interaction thereof with the second pulling group 5 (option that is represented by a dashed line and labelled on the sheet with the reference 2' in the example of FIG. 4).

The invention claimed is:

1. A method for intermittent advancement of a consumable sheet of continuous material in a container manufacturing zone of a machine for manufacturing containers, wherein in said manufacturing zone a length of sheet from said sheet of continuous material is subjected to at least a sealing operation while remaining stationary and wherein said manufacturing zone is downstream of a folding zone, the method comprising:

an advancement phase causing an advancement of the length of sheet to the manufacturing zone by actuating a first pulling group and a second pulling group, wherein the first pulling group is arranged at an end of the manufacturing zone and the second pulling group is arranged at an end of the folding zone or at a beginning of the manufacturing zone, wherein the first pulling group is actuated by a first motor and the second pulling group is actuated by a second motor, and wherein the advancement phase comprises actuating the first pulling group and the second pulling group to drive the first pulling group and the second pulling group intermittently;

measuring a tension of the length of sheet between the first pulling group and the second pulling group at least one time;

comparing the tension measured with a pre-established target tension value; and in a correction phase, prior to performing the sealing operation on the length of sheet, actuating at least one of the first motor or the second motor such that the respective first pulling group or the second pulling group has ensured a definitive advancement of longitudinal portions of the length of sheet sufficiently different as to correct deviations of the tension measured of the length of sheet with respect to the target tension value.

2. The method according to claim 1, wherein in the correction phase, the actuating at least one of the first motor or the second motor comprises actuating only one of the first motor and the second motor during a time interval.

3. The method according to claim 2, wherein in the correction phase, the actuating at least one of the first motor or the second motor comprises actuating the second motor in a direction that the second pulling group ensures a backward motion of an excess longitudinal portion of the length of sheet when the tension value measured is below the target tension value.

4. The method according to claim 2, wherein in the correction phase, the actuating at least one of the first motor or the second motor comprises actuating the second motor in a direction that the second pulling group ensures a forward motion of an extra longitudinal portion of the length of sheet when the tension value measured exceeds the target tension value.

5. The method according to claim 1, wherein the advancement phase comprises actuating the first and second motor such that the first and second pulling groups ensure advancement of different longitudinal portions of the length of sheet.

6. The method according to claim 1, wherein in the correction phase, the actuating at least one of the first motor or the second motor comprises actuating the second motor before actuating the first motor to thus attenuate tension peaks in the length of sheet during the advancement phase.

7. The method according to claim 1 wherein the step of measuring the tension of the length of sheet between the first pulling group and the second pulling group at least one time occurs while the length of sheet is stationary.

* * * * *